United States Patent [19]

Noguchi et al.

[11] Patent Number: 4,596,735
[45] Date of Patent: Jun. 24, 1986

[54] MAGNETIC RECORDING MEDIUM AND METHOD FOR MAKING

[75] Inventors: Kiyoshi Noguchi; Koji Kobayashi; Suguru Takayama, all of Tokyo, Japan

[73] Assignee: TDK Corporation, Tokyo, Japan

[21] Appl. No.: 603,894

[22] Filed: Apr. 25, 1984

[30] Foreign Application Priority Data

Apr. 30, 1983 [JP] Japan .................................. 58-76640

[51] Int. Cl.$^4$ .............................................. G11B 5/64
[52] U.S. Cl. .............................. 428/215; 204/192 M; 360/134; 360/135; 360/136; 427/128; 427/129; 427/131; 427/132; 428/216; 428/336; 428/694; 428/900
[58] Field of Search ................. 427/38, 131, 132, 128, 427/129; 428/694, 900, 336, 215, 216; 204/192 M; 360/134-136

[56] References Cited

U.S. PATENT DOCUMENTS

| | | | |
|---|---|---|---|
| 3,795,542 | 3/1974 | Halaby | 204/192 M |
| 3,829,372 | 8/1974 | Heller | 204/192 M |
| 4,013,534 | 3/1977 | Ishii | 204/192 M |
| 4,220,117 | 9/1980 | Shinohara | 427/132 |
| 4,323,629 | 4/1982 | Kunieda | 428/688 |
| 4,387,136 | 6/1983 | Saito | 427/131 |
| 4,450,186 | 5/1984 | Shinohara | 427/132 |
| 4,477,489 | 10/1984 | Yanai | 427/132 |

FOREIGN PATENT DOCUMENTS

| | | | |
|---|---|---|---|
| 85404 | 7/1978 | Japan | 427/131 |
| 0075499 | 7/1978 | Japan | 204/192 M |

OTHER PUBLICATIONS

Schneider, "Fabrication and Properties of Fe/Fe Oxide and Co/Co Oxide Films", *IEEE Trans. on Magnetics*, vol. Mag-9, (No. 3), Sep. 1973, pp. 183-185.

Journal of Applied Physics, 36, No. 3, pp. 972-974 (1965).

The Fourth International Conference on Video and Data Recording IERE Conference Proceedings No. 54.

*Primary Examiner*—Ellis P. Robinson
*Attorney, Agent, or Firm*—Oblon, Fisher, Spivak, McClelland & Maier

[57] ABSTRACT

In a magnetic recording medium comprising a non-magnetic substrate and a magnetic layer of Co or Co-Ni in the form of a continuous thin film on the substrate, the magnetic layer has oxygen-rich sub-layers at its surfaces adjacent to and remote from the substrate. The oxygen-rich sub-layers are produced by injecting energy particles containing oxygen to the surface of the substrate during the initial and final stages of formation of the magnetic layer.

32 Claims, 1 Drawing Figure

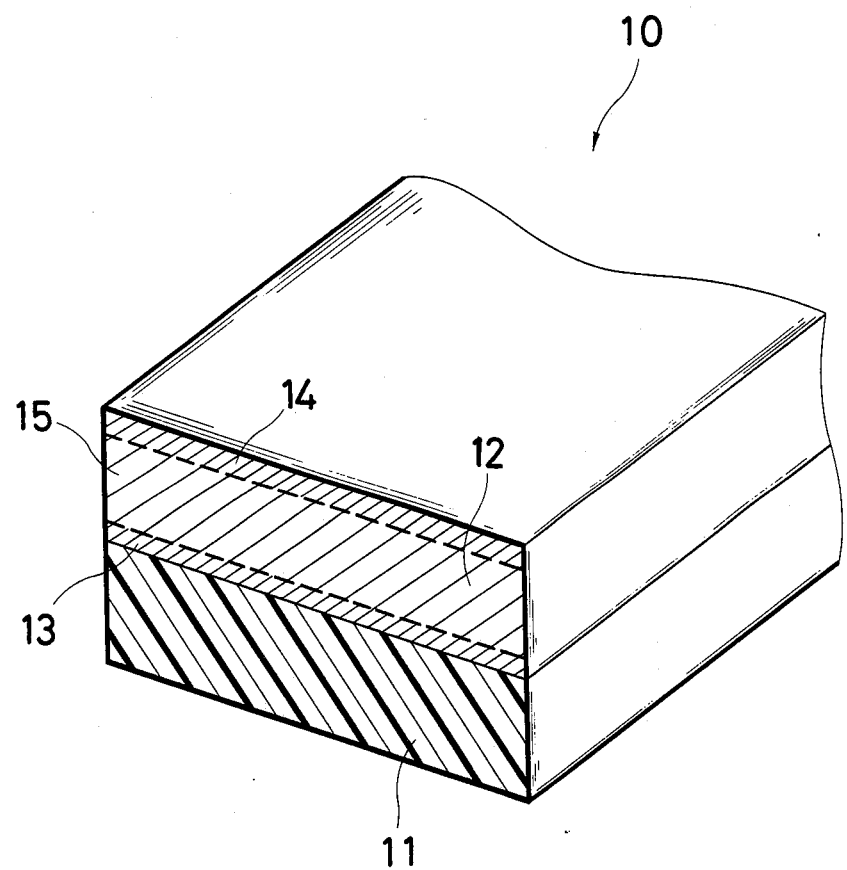

MAGNETIC RECORDING MEDIUM AND METHOD FOR MAKING

BACKGROUND OF THE INVENTION

This invention relates to magnetic recording media, and more particularly, to magnetic recording media having a magnetic layer in the form of a continuous thin film formed by the so-called oblique incidence evaporation process.

Among magnetic recording media for use in video, audio and other applications, active research and development works have been made on magnetic recording media, usually magnetic tapes having a magnetic layer in the form of a continuous thin film because of the compactness of a roll of tape.

The preferred magnetic layers for such continuous film type media are deposited films of Co, Co-Ni, and similar systems formed by the so-called oblique incidence evaporation process in which cobalt and optional elements are evaporated and directed to a substrate at a given angle with respect to the normal to the substrate because such evaporated films exhibit superior characteristics. The evaporated magnetic layers, however, have many disadvantages including insufficient bond between the magnetic layer and the substrate, high dynamic friction, poor travel, and inferior still performance in the still mode operation in video applications.

To obviate such shortcomings, magnetic layers are often formed in the presence of oxygen. The incorporation of oxygen contributes to some, but insufficient improvements in adhesion, dynamic friction, travel, and still performance. In addition, since magnetic characteristics and the above-mentioned characteristics are greatly changed with the amount of oxygen incorporated, it is difficult to control the factors to achieve a satisfactory compromise among these characteristics. The introduction of a considerable amount of oxygen into an evaporation equipment leads to additional disadvantages that the evaporation equipment must be more carefully operated and a molten evaporation source material is oxidized in a crucible.

It is also known to carry out a post-treatment on a magnetic layer to oxidize the magnetic layer surface. Dynamic friction is reduced while adhesion remains poor and still performance are insufficient.

SUMMARY OF THE INVENTION

It is, therefore, a primary object of the present invention to provide an improved magnetic recording medium having a magnetic layer firmly bonded to a substrate and exhibiting reduced dynamic friction at the magnetic layer surface and improved travel properties as well as good still performance without sacrifice of ease of fabrication.

It is another object of the present invention to provide a method for making such an improved recording medium.

According to a first aspect of the present invention, there is provided a magnetic recording medium comprising a non-magnetic substrate and a magnetic layer in the form of a continuous thin film on the substrate. The magnetic layer has sub-layers at its surfaces adjacent to and remote from the substrate, the sub-layers being richer in oxygen than the remaining or intermediate portion of the layer.

According to a second aspect of the present invention, a method for making a magnetic recording medium by forming a magnetic layer in the form of a continuous thin film on a non-magnetic substrate is characterized by directing energy particles containing oxygen to the surface of the substrate on which the magnetic layer is being formed during an initial stage of formation of the magnetic layer and during and/or after formation of that surface portion of the magnetic layer positioned remote from the substrate.

According to a third aspect of the present invention, a method for making a magnetic recording medium by forming a magnetic layer in the form of a continuous thin film on a non-magnetic substrate is characterized by directing energy particles containing oxygen to the surface of the substrate on which the magnetic layer is being formed during an initial stage of formation of the magnetic layer, and introducing gaseous oxygen into the layer-forming site during formation of that surface portion of the magnetic layer positioned remote from the substrate.

According to a fourth aspect of the present invention, a method for making a magnetic recording media by forming a magnetic layer in the form of a continuous thin film on a non-magnetic substrate is characterized by directing energy particles containing oxygen to the surface of the substrate on which the magnetic layer is being formed during an initial stage of formation of the magnetic layer, and subjecting the surface of the magnetic layer to an oxidizing treatment after formation of the magnetic layer.

According to a fifth aspect of the present invention, a method for making a magnetic recording medium by forming a magnetic layer in the form of a continuous thin film on a non-magnetic substrate is characterized by introducing oxygen into the layer-forming site during an initial stage of formation of the magnetic layer, and during and/or after formation of that surface portion of the magnetic layer positioned remote from the substrate, directing energy particles containing oxygen to said surface portion.

BRIEF DESCRIPTION OF THE DRAWING

The invention will be more readily understood from the following description when taken in conjunction with the accompanying drawing, in which:

FIG. 1 is a perspective, partially cross-sectional, view of the magnetic recording medium of the present invention.

DETAILED DESCRIPTION OF THE INVENTION

Referring to FIG. 1, the magnetic recording medium 10 of the present invention has a magnetic layer 12 on a substrate 11. The magnetic layer 12 is of continuous thin film type coextending over the substrate 11. The magnetic layer used herein may be of any well-known composition selected from Co alone, Co-Ni, Co-Cr, Co-Ti, Co-Mo, Co-V, Co-W, Co-Re, Co-Ru, Co-Mn, Co-Fe, Fe alone, and other systems, and may be formed by any well-known process, for example, evaporation and ion plating.

Most preferred results are obtained when the magnetic layer has a composition based on cobalt and containing oxygen and optionally nickel and/or chromium.

In a preferred embodiment, the magnetic layer may consist essentially of cobalt alone or cobalt and nickel. When nickel is contained, the weight ratio of Co/Ni is preferably at least about 1.5. The magnetic layer may further contain chromium in addition to cobalt or cobalt and nickel. The presence of chromium contributes to further improvements in electromagnetic characteristics, output level, signal-to-noise (S/N) ratio, and film strength. In this case, preferably the weight ratio of Cr/Co or Cr/(Co+Ni) ranges from about 0.001 to about 0.1, and more preferably from about 0.005 to about 0.05.

The magnetic layer should further contain oxygen according to the present invention. The average amount of oxygen in the magnetic layer is preferably selected to give an atomic ratio of O/Co or O/(Co+Ni) of about 0.5 or lower, and more preferably from about 0.05 to about 0.3.

Oxygen has a concentration profile in the direction of thickness of the magnetic layer. That is, the magnetic layer 12 includes oxygen rich sub-layers 13 and 14 at its surfaces adjacent to and remote from the substrate 11 as shown in FIG. 1 in an exaggerated manner. The oxygen rich sub-layers 13 and 14 contain more oxygen atoms than an intermediate portion 15 of the magnetic layer. The oxygen content of these two oxygen rich sub-layers is preferably selected to give an atomic ratio of O/Co or O/(Co+Ni) ranging from about 2/10 to 5/10, and more preferably from about 3/10 to 5/10. The oxygen content of each of these two oxygen rich sub-layers 13 and 14 is higher by at least 50% than that of the intermediate portion 15 of the magnetic layer. It would be understood that the boundaries between the sub-layers 13, 14 and the intermediate portion 15 are not as definite as illustrated because the oxygen profile has a gradient which is actually sharp.

Each of the oxygen rich sub-layers has a thickness of from about 50 to about 500 angstrom, and more preferably from about 50 to about 200 angstrom while the magnetic layer has a thickness of from about 0.05 to about 0.5 micrometers, and more preferably from about 0.07 to about 0.3 micrometers.

The magnetic layer may further contain trace elements, particularly transition metal elements, for example, Fe, Mn, V, Zr, Nb, Ta, Ti, Zn, No, W, Cu, etc.

The magnetic layer preferably consists of a coalescence of cobalt-based particles of columnar structure. Preferably, each columnar particle extends substantially throughout the thickness of the magnetic layer and has a longitudinal axis directed at an angle in the range of 10° to 70° with respect to the normal to the major surface of the substrate. Each crystalline particle has a minor diameter of from about 50 to about 500 angstrom. It should be noted that oxygen is present on the surface of each columnar structure particle essentially in the form of compounds or oxides.

The substrate which can be used in the practice of the invention is not particularly limited as long as it is non-magnetic, although flexible substrates, particularly substrates of polyester, polyimide, polypropylene and other resins are preferred, commonly in the form of a length of tape. The thickness of the substrate varies over a wide range and is preferably in the range of about 5 to about 20 microns. The back surface of the substrate which is opposite to the magnetic layer-bearing surface may be provided with a suitable back coat. The back surface of the substrate may preferably have a surface roughness of more than 0.05 μm (inclusive) as expressed in RMS (root mean square) value.

It will be understood that the magnetic layer may be formed on the substrate either directly or via an undercoat layer. Further, the magnetic layer is generally formed as a single layer, but in come cases, it may be made up from a plurality of laminated layers with or without an intermediate non-magnetic layer interposed therebetween. The magnetic layer may also be covered with any suitable topcoat.

The magnetic recording medium as defined above may be made by a variety of methods. It is particularly preferred to direct energy particles containing oxygen to the layer-forming site or the formed layer during an initial stage of formation of the magnetic layer and during and/or after formation of that surface portion of the magnetic layer positioned remote from the substrate because the bond of the magnetic layer to the substrate and the dynamic friction of the magnetic layer are improved and the still performance are significantly enhanced.

Preferably, injection is made using energy particles accelerated with an energy of higher than about 10 eV (inclusive), and more preferably from about 10 eV to about 10 keV. The energy particles used herein contain oxygen in the form of either ionic oxygen such as $O_2^-$ and $O_2^+$ or neutral oxygen such as $O_2$ and neutral active oxygen, $O_2^*$. Oxygen is generally contained in the energy particles in an amount of at least 20 atom %. The energy particles may further contain argon, nitrogen, helium, ozone, or the like in addition to oxygen.

To inject oxygen-containing energy particles, an ion gun may be used which functions to convert a gas into a plasma by cold-cathode discharge and eject the thus ionized gas component combined with an active neutral gas component in the form of a beam. Preferably, the ion gun is designed such that the operating pressure is on the order of 0.1 to 100 Pa, the beam size is on the order of 10 to 100 mm by 10 to 1000 mm, the gun-substrate distance is on the order of 10 to 500 mm, and the energy imparted to particles is on the order of 10 eV to 10 keV. The use of such an ion gun enables energy particles containing ionic oxygen and neutral oxygen to be injected.

A neutral particle gun may also be used, namely an atom bombardment gun in which a gas is converted into a plasma and the plasma is injected in the form of a beam while the ionized component is removed from the beam output. The neutral particle gun is designed such that the operating pressure is on the order of 0.1 to 100 Pa, the beam size is on the order of 10 to 100 mm by 10 to 1000 mm, the gun-substrate distance is on the order of 10 to 500 mm, and the energy imparted to particles is on the order of 10 eV to 10 keV. The use of such a neutral particle gun enables neutral active oxygen gas to be injected.

One preferred stage at which such oxygen-containing energy particles are directed or injected to the layer-forming site is an initial stage of forming the magnetic layer. The initial stage of forming the magnetic layer is from the biginning to the point when the magnetic layer is formed to about one-third (⅓), and more preferably about one-fourth (¼) of the final thickness. Energy particles may be directed at any suitable time within the initial stage of forming the magnetic layer, and preferably, when that surface of the magnetic layer positioned adjacent to the substrate is being formed. At this point, there is formed an interfacial region in which the magnetic layer-forming component, the substrate component and oxygen are mixed and reacted with each other, resulting in the increased bond of the magnetic layer to the substrate.

Before the beginning of formation of a magnetic layer, energy particles may also be injected to the surface of the substrate on which the magnetic layer is to be formed.

In addition to or instead of the initial stage of formation of the magnetic layer, engergy particles may be injected during and/or after formation of that surface portion of the magnetic layer positioned remote from the substrate. The stage of formation of the surface portion of the magnetic layer positioned remote from the substrate is the final stage of formation of the magnetic layer after the magnetic layer is formed to about two-thirds ($\frac{2}{3}$) and preferably about three-fourths ($\frac{3}{4}$) of the final thickness. Energy particles may be injected at any suitable time within the final stage of formation of the magnetic layer, and particularly when that surface of the magnetic layer positioned remote from the substrate is being formed.

Energy particles may also be injected into the magnetic layer on the substrate at the end of and preferably immediately after formation of the magnetic layer.

In the practice of the present invention, energy particles are preferably injected during at least either of the initial and final stages of formation of the magnetic layer. Irradiation at the initial stage is effective in significantly improving the bond and still performance while irradiation at the final stage is effective in significantly improving the travel and still performance and corrosion resistance. Of course, all these characteristics are more improved by double irradiation at the initial and final stages.

When irradiation is made at either the initial or the final stage, another type of treatment must be separately carried out. One example of the other type of treatment is to introduce oxygen into the layer-forming site during formation of the surface portion of the magnetic layer positioned adjacent to or remote from the substrate. In this case, oxygen is introduced by blowing before the magnetic layer is formed to $\frac{1}{3}$, and preferably $\frac{1}{4}$ of the final thickness or after the magnetic layer is formed to $\frac{2}{3}$, and preferably $\frac{3}{4}$ of the final thickness. Oxygen may be fed at a rate of about 10 to 1000 ml per minute. During the supply of oxygen, the layer-forming site may be kept under an electric discharge.

When energy particles are injected or directed to the layer-forming site on the substrate during the initial stage of formation of the magnetic layer, an oxidizing treatment may be further carried out at the end of formation of the magnetic layer. The oxidizing treatments applicable herein include the following types of treatment.

(1) Dry Treatment (a) Glow treatment

An oxygen-containing gas such as $O_2$, $H_2O$, and $O_2+H_2O$ and an inert gas such as argon and nitrogen are subjected to a glow discharge to form a plasma to which the surface of the magnetic layer is exposed.

(b) Oxidizing gas

An oxidizing gas such as ozone and heated steam is blown to the magnetic layer surface.

(c) Heat treatment

Oxidation is carried out by heating to a temperature of about 60° to 150° C.

(2) Wet Treatment (a) Anodic oxidation
(b) Alkali treatment (c) Acid treatment The magnetic layer surface is treated with a chromate, permanganate, phosphate or another acid.

(d) Treatment with oxidizing agent $H_2O_2$ and other oxidizing agents are used.

In the practice of the present invention, the magnetic layer is preferably formed by the so-called oblique incidence evaporation process although electric field evaporation, ion plating and other well-known techniques may also be used.

The oblique incidence evaporation process may be carried out by any of well-known techniques preferably using an electron beam gun while the minimum incident angle with respect to the normal to the substrate is preferably at least 20 degrees. Incident angles of less than 20 degrees detract from electromagnetic characteristics. The remaining evaporation conditions are not particularly limited. More illustratively, the evaporation atmosphere may be an inert atmosphere such as argon, helium and vacuum or an atmosphere containing a low level of oxygen gas as usual. The pressure may be of the order of $10^{-5}$ to $10^0$ Pa. The distance between the evaporation source and the substrate, the direction of transport of the substrate, and the structure and arrangement of a can and a mask may be properly selected from well-known conditions. In this case, the presence of oxygen in the evaporation atmosphere will improve electromagnetic characteristics and corrosion resistance. In the practice of the present invention, the content of oxygen may be lowered to $10^{-3}$ Pa or less so that the evaporation equipment may be operated without trouble and the oxidization of a source material in a crucible is minimized.

For further information about the evaporation process, reference should be made to D. E. Speliotis et al., J. Appl. Phys., 36, 3, 972 (1965) and Y. Maezawa et al., "Metal thin film video tape by vacuum deposition", IERE Conference Proceedings 54 (The Fourth International Conference on Video and Data Recording, The University of Southampton, Hampshire, England, Apr. 20–23, 1982), pp. 1–9.

The magnetic recording media of the invention find applications in video and audio use and computers as tape and discs, typically floppy discs. They may also be used as media for vertical magnetization.

The magnetic recording media of the invention have the advantages of the increased bond between the magnetic layer and the substrate, reduced dynamic friction of the magnetic layer and smoother travel. These result in improved still performance. Improved corrosion resistance is another feature of the magnetic recording media of the invention.

Since the use of an oxygen-containing atmosphere is obviated or the amount of oxygen can be reduced in forming the magnetic layer, the evaporation equipment can be conveniently operated without oxidation of a source material.

According to the second to fifth aspects of the present invention, the above-described advantages are further enhanced. The bond strength, travel and still characteristics, and corrosion resistance are improved according to the second aspect of the present invention. The bond strength and still characteristics are particularly improved according to the third and fourth aspects of the present invention. The travel and still characteristics and corrosion resistance are particularly improved according to the fifth aspect of the present invention.

Examples of the present invention are presented below by way of illustration, but not by way of illustration.

EXAMPLE 1

Using a Co-Ni alloy having a Co/Ni weight ratio of 4/1, a magnetic layer of 0.2 μm thick was formed on a polyethylene terephthalate (PET) film of 12 μm thick by the oblique incidence evaporation process. The substrate was continuously transported from a supply roll to a take-up roll by way of a can. The incident angle of the evaporated material was set to 90 to 45 degrees. The evaporation atmosphere had a partial pressure of argon of $10^{-2}$ Pa.

A control sample A0 was prepared in the above-described conditions without introducing oxygen.

Separately, a comparative sample A1 was prepared in the above-described conditions except that the evaporation atmosphere had an argon partial pressure $P_{Ar}=10^{-2}$ Pa and an oxygen partial pressure $P_{O_2}=3\times 10^{-2}$ Pa.

Samples according to the present invention were prepared by introducing ionic oxygen plus neutral oxygen or neutral oxygen to that portion of the magnetic layer which extended 0.02 μm from its interface with the substrate and/or that portion of the magnetic layer which extended 0.03 microns from its surface located remote from the substrate using an ion gun or neutral particle gun.

The ion gun had a beam output of 100 mA and an accelerating voltage of 1 kV and was located at a distance of 150 mm from the substrate while the oxygen source was argon plus oxygen ($O_2$). The neutral particle gun had a beam output of 25 mA and a particle energy of 2 keV and was located at a distance of 100 mm from the substrate while the oxygen source was argon plus oxygen ($O_2$).

For some samples, oxygen was blown at a flow rate of 50 ml per minute to the layer-forming site of that surface portion of the magnetic layer which extended 0.02 μm from its surface adjacent to the substrate and/or that surface portion of the magnetic layer which extended downward 0.03 μm from its surface remote from the substrate. An electric discharge at AC 1 kV was applied to the layer-forming site.

At the end of formation of the magnetic layer, it was subjected to any one of the following oxidizing treatments.

For some samples, the magnetic layer was exposed to a glow discharge at 60 Hz, 500 V and 1 A in an atmosphere containing 20% of $H_2O$, 20% of $O_2$ and 60% of $N_2$ and having a total pressure of 2 Pa.

For some samples, the magnetic layer was exposed to an atmosphere containing 5% of ozone at a temperature of 60° C.

For some samples, the magnetic layer was heated to a temperature of 80° C. in an atmosphere having a relative humidity of 30%.

The above-described treatments were combined as shown in Table 1, obtaining samples A2, A3 and B1–B8. The samples were tested for various properties. A commercially availabale VTR equipment was loaded with each sample in the form of video tape.

(1) Dynamic Friction

A sample tape was driven over 50 passes in the VTR equipment. The dynamic friction coefficient μ of the sample was measured at a temperature of 40° C. and a relative humidity of 80% both at the initial and after 50 passes.

(2) Runnability

A sample tape was driven over 50 passes in the VTR equipment. The magnitude of signal output of the sample was measured at 4 MHz both at the initial and after 50 passes. The output reduction after 50 passes was expressed in dB.

(3) Still Life

The VTR equipment loaded with a sample tape was operated in the still mode. The still life time (expressed in minute) of the sample tape was measured until the still picture disappeared.

(4) Dropout

A sample tape was played in the reproduction mode. Dropouts were counted as the number per minute of output reductions by 16 dB or more.

(5) Corrosion Resistance

A sample was allowed to stand for 7 days at a temperature of 50° C. and a relative humidity of 90%. A reduction in magnetic flux quantity Δφm per square centimeter was measured.

The results are shown in Table 1.

Table 2 shows the thickness and the atomic ratio of O/(Co+Ni) of the upper and lower oxygen-rich sublayers 14 and 13 (in the FIGURE), and the atomic ratio of O/(Co+Ni) in the intermediate region of samples B1–B8.

TABLE 1

| Sample | Preparation Evaporation atmosphere | Initial treatment* | Final treatment* | μ Initial | After 50 passes | 4 MHz output reduction after 50 passes, dB | Still life, min. | Dropouts,/ min. | Corrosion resistance Δφm, % |
|---|---|---|---|---|---|---|---|---|---|
| A0 | Ar | — | — | 0.4 | undetectable | undetectable | <1 | 5000 | 40 |
| A1 | Ar + $O_2$ | — | — | 0.35 | undetectable | undetectable | <1 | 5000 | 30 |
| A2 | " | $O_2$ | — | 0.35 | undetectable | undetectable | <1 | 5000 | 30 |
| A3 | " | — | plasma | 0.25 | 0.3 | 6 | 3 | 500 | 15 |
| B1 | Ar | I.G. | I.G. | 0.2 | 0.2 | 2 | >10 | 200 | 8 |
| B2 | Ar + $O_2$ | I.G. | I.G. | 0.2 | 0.2 | 1 | >10 | 100 | ≦5 |
| B3 | " | N.G. | N.G. | 0.25 | 0.25 | 2 | >10 | 100 | ≦5 |
| B4 | " | I.G. | $O_2$ | 0.25 | 0.26 | 2 | >10 | 200 | ≦5 |
| B5 | " | $O_2$ | I.G. | 0.2 | 0.22 | 2 | >10 | 150 | ≦5 |
| B6 | " | N.G. | plasma | 0.25 | 0.25 | 1 | >10 | 100 | ≦5 |
| B7 | " | N.G. | ozone | 0.2 | 0.22 | 1 | >10 | 150 | ≦5 |

TABLE 1-continued

| Sample | Preparation | | | μ | | 4 MHz output reduction after 50 passes, dB | Still life, min. | Dropouts,/ min. | Corrosion resistance Δφm, % |
|---|---|---|---|---|---|---|---|---|---|
| | Evaporation atmosphere | Initial treatment* | Final treatment* | Initial | After 50 passes | | | | |
| B8 | " | I.G. | heating | 0.25 | 0.25 | 1 | >10 | 200 | ≦5 |

*$O_2$: oxygen introduction
I.G.: ion gun
N.G.: neutral particle gun
plasma: plasma treatment
ozone: ozone treatment

TABLE 2

| | O/(Co + Ni), atomic ratio | | | Thickness, μm | |
|---|---|---|---|---|---|
| Sample | Lower sub-layer | Intermediate region | Upper sub-layer | Lower sub-layer | Upper sub-layer |
| B1 | 0.4 | ~0 | 0.4 | 0.02 | 0.03 |
| B2 | 0.4 | 0.1 | 0.4 | 0.02 | 0.03 |
| B3 | 0.3 | 0.1 | 0.3 | 0.02 | 0.03 |
| B4 | 0.4 | 0.1 | 0.3 | 0.02 | 0.03 |
| B5 | 0.3 | 0.1 | 0.4 | 0.03 | 0.03 |
| B6 | 0.3 | 0.2 | 0.4 | 0.02 | 0.04 |
| B7 | 0.3 | 0.2 | 0.4 | 0.02 | 0.04 |
| B8 | 0.4 | 0.2 | 0.4 | 0.03 | 0.04 |

The data of Table 1 clearly shows the benefits of the present invention.

EXAMPLE 2

In this example, an alloy having a weight ratio of Co/Ni/Cr=65/30/5 was used for deposition in an atmosphere having an argon partial pressure of $P_{Ar}=10^{-2}$ and an oxygen partial pressure of $P_{O2}=10^{-2}$ Pa. A sample A11 was prepared by following the procedure of Example 1.

A sample B11 was prepared using an ion gun as sample B2 was. The oxygen-rich sub-layers of sample B11 were substantially equivalent with those of sample B2.

The results are shown in Table 3. The data of Table 3 also clearly shows the benefits of the present invention.

TABLE 3

| | Sample | |
|---|---|---|
| | A11 | B11 |
| Dynamic friction coefficient, μ | | |
| Initial | 0.35 | 0.2 |
| After 50 passes | undetectable | 0.2 |
| 4 MHz output reduction after 50 passes, dB | undetectable | 1 |
| Still life, minute | <1 | >10 |
| Dropouts,/minute | 5000 | 100 |
| Corrosion resistance Δφm, % | 20 | 3 |

We claim:

1. In a magnetic recording medium comprising a non-magnetic substrate and a magnetic layer in the form of a continuous thin film on the substrate, the magnetic layer consisting essentially of cobalt, oxygen and at least one nickel and chromium, the improvement wherein said magnetic layer has at its surfaces adjacent to and remote from said substrate sub-layers which are richer in oxygen than the remaining intermediate portion of the magnetic layer.

2. The magnetic recording medium according to claim 1 wherein the oxygen content of each of the oxygen-rich sub-layers ranges from 0.2 to 0.5 in atomic ratio based on the metal content of said sub-layers.

3. The magnetic recording medium according to claim 1 or 2 wherein each of the oxygen-rich sub-layers has a thickness of about 50 to about 500 angstrom.

4. The magnetic recording medium according to claim 1 wherein the oxygen content of each of the oxygen rich sub-layers is at least 50% higher than that of the remaining portion.

5. The magnetic recording medium according to claim 1 wherein the magnetic layer contains nickel and the weight ratio of Co/Ni is at least about 1.5.

6. The magnetic recording medium according to claim 5 wherein the magnetic layer contains chromium and the weight ratio of Cr/Co or Cr/(Co+Ni) ranges from about 0.001 to about 0.1.

7. The magnetic recording medium according to claim 5 wherein the magnetic layer has an atomic ratio of O/Co or O/(Co+Ni) of about 0.5 or lower.

8. The magnetic recording medium according to claim 1 wherein the magnetic layer has a thickness of about 0.05 to about 0.5 micrometers.

9. A method for making a magnetic recording medium comprising the steps of forming a magnetic layer in the form of a continuous thin film on a non-magnetic substrate by evaporating cobalt and at least one of nickel and chromium, and directing energy particles containing oxygen to the surface of the substrate on which the magnetic layer is being formed during an initial stage of formation of the magnetic layer and at least one of the periods during formation of that surface portion of the magnetic layer positioned remote from the substrate and after formation of that surface portion of the magnetic layer positioned remote from the substrate, thereby producing a magnetic layer consisting essentially of an oxygen-rich portion adjacent to the substrate, an oxygen-poor intermediate portion, and an oxygen-rich portion remote from the substrate.

10. The method according to claim 9 wherein the oxygen contain ionic oxygen.

11. The method according to claim 9 or 10 wherein the oxygen contain neutral oxygen.

12. The method according to claim 9 wherein the energy particles are directed during the initial stage of formation of the magnetic layer until the magnetic layer is formed to ⅓ of the final thickness and during a final stage of formation of the magnetic layer after the magnetic layer has been formed to ⅔ of the final thickness.

13. The method according to claim 9 wherein the energy particles have an energy in the range of about 10 eV to about 10 keV.

14. The method according to claim 9 wherein the magnetic layer is formed by depositing an evaporated source material to the surface of the substrate at an angle with respect to the normal to the substrate surface.

15. A method for making a magnetic recording medium comprising the steps of forming a magnetic layer in the form of a continuous thin film on a non-magnetic substrate by evaporating cobalt and at least one of nickel and chromium, and directing energy particles containing oxygen to the surface of the substrate on which the magnetic layer is being formed during an initial stage of formation of the magnetic layer, and introducing oxygen gas into the layer-forming site during formation of that surface portion of the magnetic layer positioned remote from the substrate, thereby producing a magnetic layer consisting essentially of an oxygen-rich portion adjacent to the substrate, an oxygen-poor intermediate portion, and an oxygen-rich portion remote from the substrate.

16. The method according to claim 15 wherein the oxygen in the energy particles contain ionic oxygen.

17. The method according to claim 15 or 16 wherein the oxygen in the energy particles contain neutral oxygen.

18. The method according to claim 15 wherein the energy particles are directed during the initial stage of formation of the magnetic layer until the magnetic layer is formed to ⅓ of the final thickness and during the final stage of formation of the magnetic layer after the magnetic layer has been formed to ⅔ of the final thickness.

19. The method according to claim 15 wherein the energy particles have an energy in the range of about 10 eV to about 10 keV.

20. The method according to claim 15 wherein the magnetic layer is formed by depositing an evaporated source material to the surface of the substrate at an angle with respect to the normal to the substrate surface.

21. A method for making a magnetic recording medium comprising the steps of forming a magnetic layer in the form of a continuous thin film on a non-magnetic substrate by evaporating cobalt and at least one of nickel and chromium, and directing energy particles containing oxygen to the surface of the substrate on which the magnetic layer is being formed during an initial stage of formation of the magnetic layer, and subjecting the surface of the magnetic layer to an oxidizing treatment after formation of the magnetic layer thereby producing a magnetic layer consisting essentially of an oxygen-rich portion adjacent to the substrate, an oxygen-poor intermediate portion, and an oxygen-rich portion remote from the substrate.

22. The method according to claim 21 wherein the oxygen contains ionic oxygen.

23. The method according to claim 21 or 22 wherein the oxygen contains neutral oxygen.

24. The method according to claim 21 wherein the energy particles are directed during the initial stage of formation of the magnetic layer until the magnetic layer is formed to ⅓ of the final thickness.

25. The method according to claim 21 wherein the energy particles have an energy in the range of about 10 eV to about 10 keV.

26. The method according to claim 21 wherein the magnetic layer is formed by depositing an evaporated source material to the surface of the substrate at an angle with respect to the normal to the substrate surface.

27. A method for making a magnetic recording medium comprising the steps of forming a magnetic layer in the form of a continuous thin film on a non-magnetic substrate by evaporating cobalt and at least one of nickel and chromium, and introducing oxygen to the layer-forming site during an initial stage of formation of the magnetic layer, and directing energy particles containing oxygen to that surface portion positioned remote from the substrate during at least one of the period of formation of said surface portion and the period after formation of said surface portion, thereby producing a magnetic layer consisting essentially of an oxygen-rich portion adjacent to the substrate, an oxygen-poor intermediate portion, and an oxygen-rich portion remote from the substrate.

28. The method according to claim 27 wherein the oxygen contains ionic oxygen.

29. The method according to claim 27 or 28 wherein the oxygen contains neutral oxygen.

30. The method according to claim 27 wherein the oxygen is introduced during the initial stage of formation of the magnetic layer until the magnetic layer is formed to about ⅓ of the final thickness, and the energy particles are directed during the final stage of formation of the magnetic layer after the magnetic layer has been formed to about ⅔ of the final thickness.

31. The method according to claim 27 wherein the energy particles have an energy in the range of about 10 eV to about 10 keV.

32. The method according to claim 27 wherein the magnetic layer is formed by depositing an evaporated source material to the surface of the substrate at an angle with respect to the normal to the substrate surface.

* * * * *